J. A. STEINMETZ.
AEROPLANE.
APPLICATION FILED NOV. 9, 1909.

1,067,559.

Patented July 15, 1913.

WITNESSES:

INVENTOR
Joseph A. Steinmetz
BY
Charles N. Butler
ATTORNEY.

UNITED STATES PATENT OFFICE.

JOSEPH A. STEINMETZ, OF PHILADELPHIA, PENNSYLVANIA.

AEROPLANE.

1,067,559.          Specification of Letters Patent.      Patented July 15, 1913.

Application filed November 9, 1909. Serial No. 526,962.

*To all whom it may concern:*

Be it known that I, JOSEPH A. STEINMETZ, a citizen of the United States, residing at Philadelphia, in the county of Philadelphia and State of Pennsylvania, have invented certain Improvements in Aeroplanes.

The improvements of my invention are designed to provide means for checking the fall of an aeroplane and to maintain its equilibrium in falling, whether in normal descent or in case of accident.

The purposes of my invention are accomplished by means of a parachute which is stowed in a suitable compartment until its action is desired, when it is ejected and expanded to support the aeroplane by peculiar means designed therefor.

The characteristic features of my improvements are disclosed in the following description and the accompanying drawings in illustration thereof.

Figure 1:
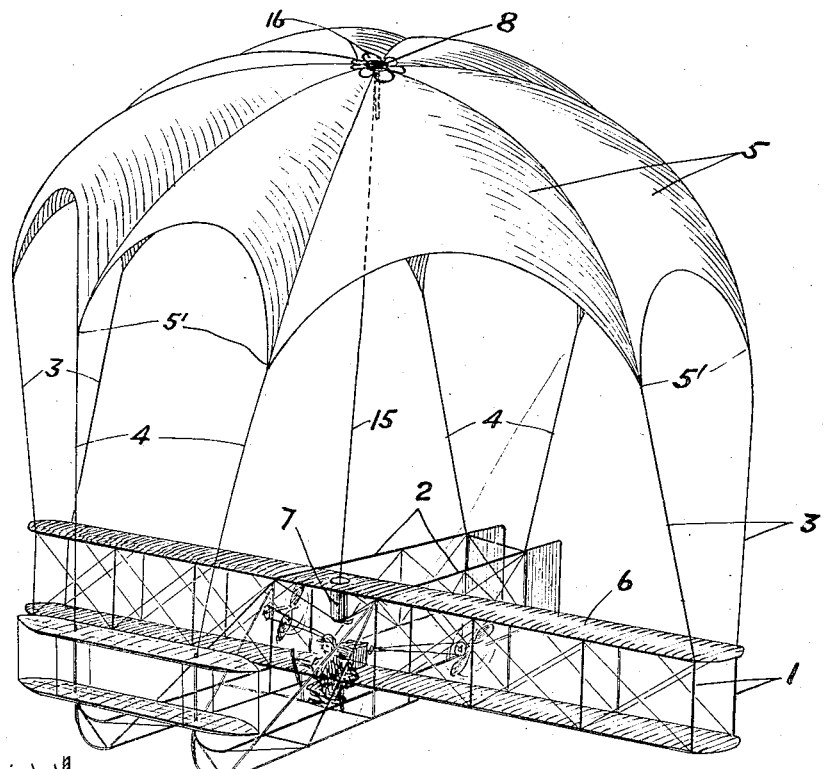
Figure 3:
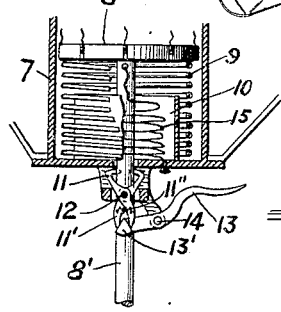
Figure 2:
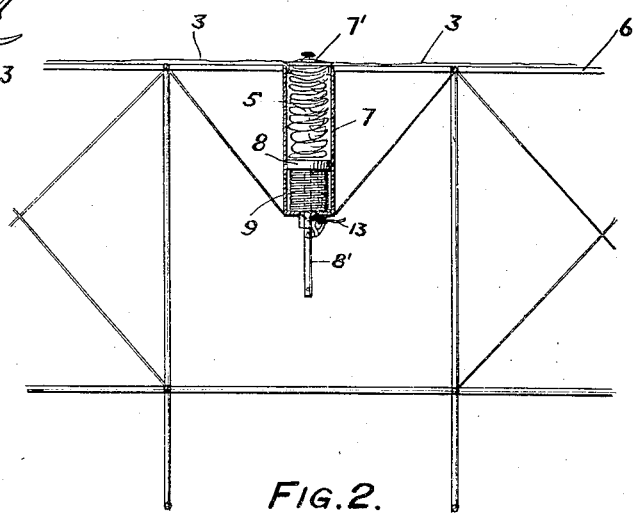

In the drawings, Figure 1 is a perspective view of an aeroplane with my improvements applied thereto; Fig. 2 is a sectional view showing details comprising the means for stowing and ejecting the parachute; and Fig. 3 is a sectional elevation of the ejecting means shown on an enlarged scale.

As shown in the drawings, the cross frames 1 and 2 of the aeroplane have secured thereto ropes 3 and 4 which are connected to the points 5' of a parachute 5. The top plane 6 of the machine has the cylinder 7 depending therefrom and opening therethrough, and the center or apex of the parachute has fixed thereto a piston 8 which is adapted to move in the cylinder 7, the piston and parachute being stowed in the cylinder when out of action. A removable cover 7' closes the top of the cylinder when the parachute is incased thereby.

In the bottom of the cylinder 7 is a coiled spring 9 which surrounds a cylindrical wall 10, and fixed to the piston 8 is a rod 8' which is adapted to pass through the bottom of the cylinder, the rod and piston being held down to compress the spring by the jaws 11 rocking on the fulcrum 12.

The jaws are held in engagement with the rod by expanding their lever arms 11' through the action of a wedge 13' of a lever 13 rocking on the fulcrum 14.

A rope 15 is connected to the rod 8' and lies normally within the chamber formed by the wall 10, the rope passing through the bottom of the cylinder so that it can be engaged by the operator for the purpose of drawing in or righting the parachute.

To release the parachute, the lever 13 is elevated to withdraw the wedge 13' from the arms 11' which are brought together by a spring 11" connecting them and the jaws are disengaged from the rod 8'. The spring 9, being released, ejects the piston 8 and the fabric of the parachute which is expanded and sustained by the resistance of the atmosphere, and acts through the ropes 3 and 4 upon the frame of the aeroplane to support the latter, maintain its equilibrium and check its descent.

The crown of the parachute, around the piston 8, is provided with the apertures 16, through which the air draws, to facilitate effecting and maintaining expansion.

Having described my invention, I claim:

In an aeroplane, frame members disposed transversely to the line of travel of the machine and having planes fixed thereto, frame members disposed transversely to said members first named, a parachute, means for stowing said parachute at substantially the intersection of said frame members, tension members connecting said parachute with the ends of the respective frame members, an ejector for liberating said parachute, and means under the control of the operator of said aeroplane for controlling said ejector.

In witness whereof I have hereunto set my name this fourth day of November, 1909, in the presence of the subscribing witnesses.

JOSEPH A. STEINMETZ.

Witnesses:
     Jos. G. DENNY, Jr.,
     ROBERT JAMES EARLEY.